Aug. 11, 1964  R. P. PASCUAL  3,144,408
GREASE TRAP

Filed Jan. 19, 1962  2 Sheets-Sheet 1

Restituto P. Pascual
INVENTOR.

BY *Thomas A. O'Brien*
*and Harvey B. Jackson*
Attorneys

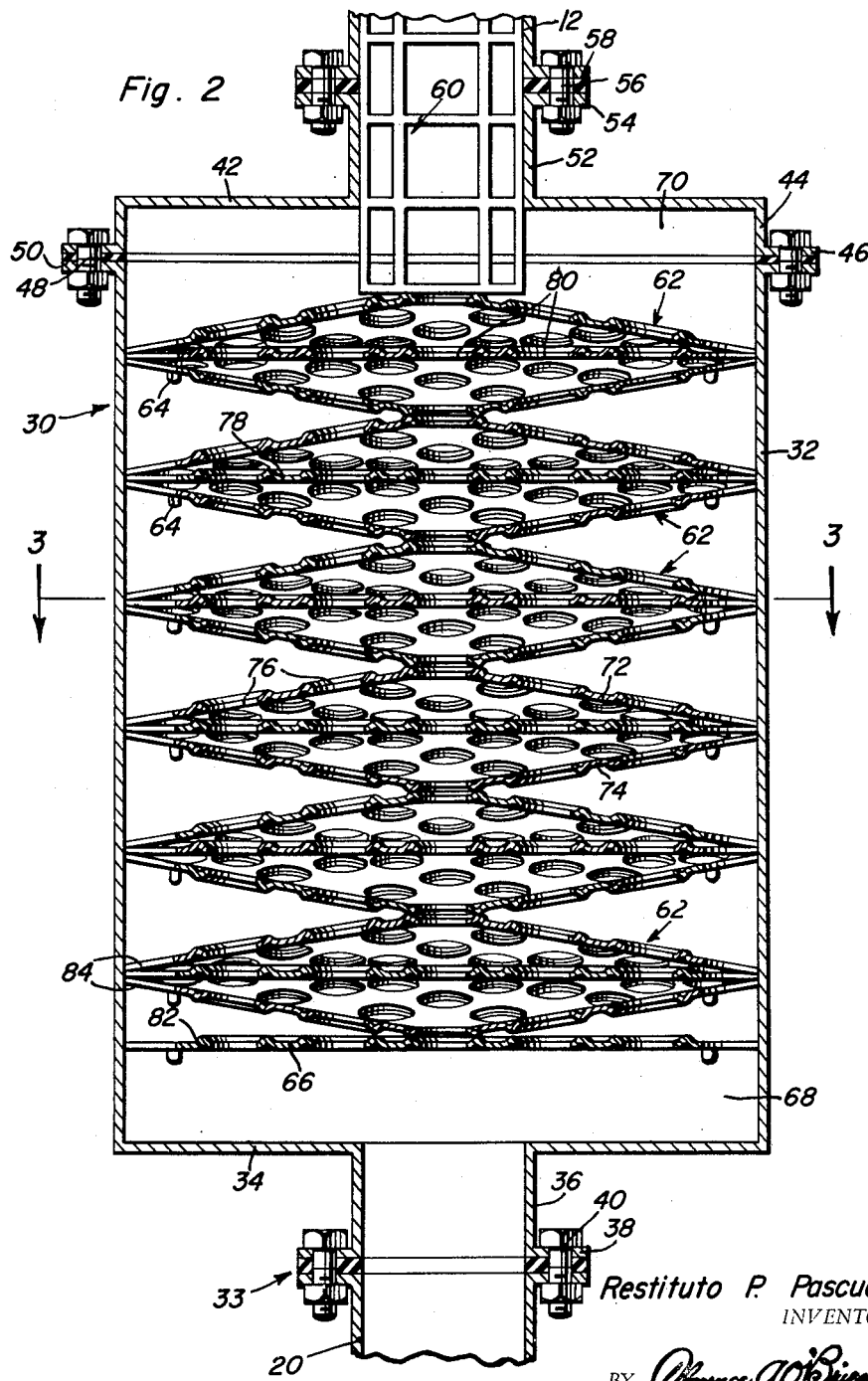

United States Patent Office 3,144,408
Patented Aug. 11, 1964

3,144,408
GREASE TRAP
Restituto P. Pascual, 2266 Medel St., Santa Ana,
Manila, Philippine Republic
Filed Jan. 19, 1962, Ser. No. 167,314
6 Claims. (Cl. 210—322)

This invention comprises a novel and useful grease trap and more particularly pertains to a removable grease filtering device adapted to be interposed in a kitchen sink drainage system between the kitchen sink and the conventional gooseneck trap of the main drain line.

In kitchen drainage systems it is well known that it is very difficlt to avoid discharging fats and greases into the drainage system from the sink. When greases and fats are so discharged, they tend to accumulate as coatings or encrustations along the walls of the drainage system throughout the entire length of the latter. Such grease deposits are very difficult to remove and eventually tend to clog up the drain system to such an extent that flow therethrough is seriously impaired if not completely stopped. To remedy this condition usually necessitates expensive repairs or treatments.

Moreover, the application of chemical agents to remove the grease from such a clogged system is at best a rather uncertain operation owing to the very large area over which the grease accumulates. Thus mechanical grease removing means are required which are in themselves quite expensive.

It is therefore the primary purpose of this invention to provide a grease trap which will effectively prevent the depositing of grease over the entire surface area of a kitchen drainage system.

A further object of the invention is to provide a grease trap which will effectively separate grease from liquids discharged into the drainage system and collect the separated grease at one location relatively easy of access whereby the grease may be mechanically or chemically removed in an efficient manner and at relatively low expense.

A further object of the invention is to provide a grease trap in accordance with the preceding objects which may be readily and easily installed in conventional kitchen drainage systems between the sink and the gooseneck trap thereof and which can be readily removed so that its cleaning elements may be replaced or may be cleaned from time to time as may be necessary.

A further and more specific object of the invention is to provide a grease trap in which a very compact arrangement of grease separating units is stacked in vertical disposition therein to afford a relatively great area of surface contact of these elements with the liquids discharged into the drainage system for separating grease therefrom.

A further and more specific object of the invention is to provide a grease trap in accordance with the preceding objects in which the grease separating unit shall be so correlated with the liquid level maintained by the gooseneck trap as to render more effective the separation of the grease from the liquids discharged into the system, provide chambers for the accumulation of coarse sediment and of granular solid matter which may be discharged into the draining system.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is an enlarged detail view in vertical section through the grease trap of this invention being taken substantially upon the plane indicated by the section line 2—2 of FIGURE 1.

Figure 1:
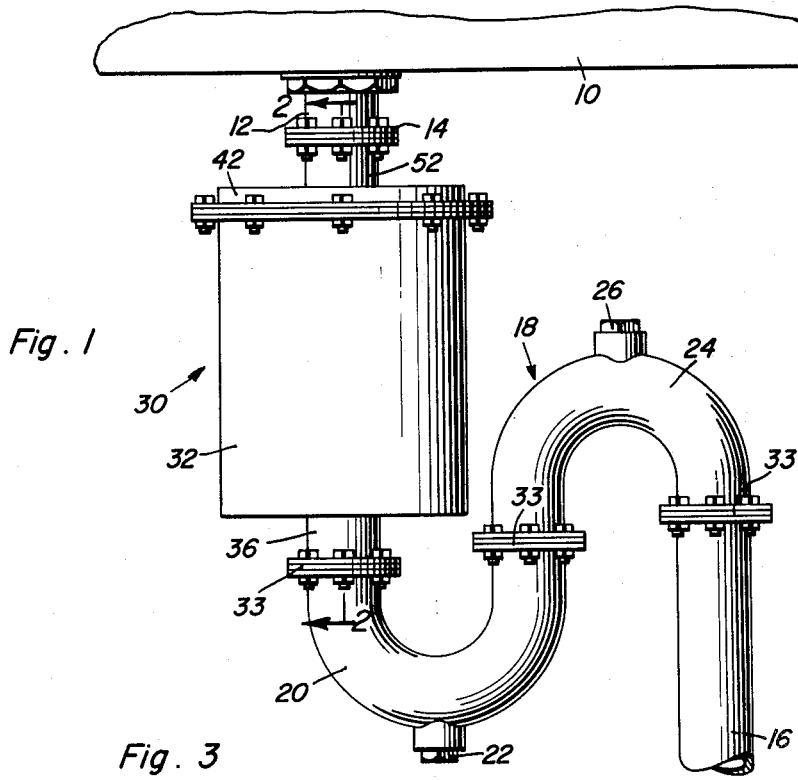
FIGURE 1 is a view in side elevation of a portion of a conventional kitchen drainage system in which the grease trap in accordance with this invention has been incorporated.

Although the grease trap of this invention may be employed in many environments with advantageous results, it is especially designed for and is particularly efficacious when used with a conventional household kitchen drainage system. In FIGURE 1 there is illustrated a portion of such a system which includes the usual kitchen sink 10, provided with the customary sink drain outlet 12 in the form of a neck having the usual coupling flange 14 thereon, the main drain line or drain pipe 16 which communicates with the sewer line of the house together with a gooseneck trap indicated generally by the numeral 18 which is interposed between the main drain line 16 and is normally directly connected to the kitchen sink drain outlet or neck 12.

As further shown in FIGURE 1, the gooseneck trap 18 includes the usual U-shaped trap 20 having at its bottom a drain plug 22 with an inverted U-shaped member 24 provided at its top with a further drain plug 26. The two U-shaped members are detachably connected to each other, to the main drain line and to the grease trap indicated generally by the numeral 30 and forming the subject matter of this invention by detachable couplings such as flanges 33.

In accordance with this invention the grease trap 30 is preferably mounted in a particular relation with respect to the gooseneck trap 18 as will be set forth hereinafter.

Referring now particularly to FIGURE 2 it will be observed that the grease trap 30 in accordance with this invention comprises a housing 32 which although indicated as being cylindrical may obviously be of other cross-sectional shapes and contours as may be found desirable. The housing is of suitable material, preferably of a suitable metallic construction, although it may be in some instances also formed of suitable plastics if desired. The housing consists of an integral bottom wall 32 thereon from which depends a neck portion 36 terminating in the annular flange 38 receiving the fasteners 40 and which constitutes the previously mentioned coupling 33. At its upper end, the housing 32 is closed by a removable top wall 42 having a cylindrical depending rim 44 comprising a continuation of the housing 32, and which rim is provided with the annular flange 46 detachably secured as by fasteners 48 to the corresponding flange 50 forming the upper end of the main body portion of the housing.

Rising from the top wall 42 is a tubular member or inlet pipe or inlet neck 52 which likewise terminates in an annular flange 54 detachably secured as by fasteners 56 to the corresponding flange 58 with which the drain outlet 12 is normally equipped.

Obviously by removing the fasteners 48 access may be had to the interior of the housing for cleaning the same, for inspection purposes and for services or repairs as may be necessary.

Indicated generally by the numeral 60 is the customary strainer basket with which kitchen sinks are usually provided and which serve to remove from the liquids discharged into the kitchen drain system various types of solid matters.

Disposed within and removably mounted within the housing 32 are a series of vertically spaced and stacked separator units each identified generally by the numeral 62. Each unit is supported by suitable support means which may consist of radially inwardly projecting lugs, ribs or brackets 64 carried upon the interior of the walls of the housing 32 in position to support thereon the circular peripheries of the units 62. Below the lowermost unit there is preferably provided the horizontally extending screen 66 in the form of a disk. The space between this disk 66 and the bottom wall 34 comprises a chamber 68 which serves as a collection chamber for the accumulation of granular solid material such as pebbles, bones or the like which may be introduced into the kitchen drain system through the sink drain outlet. Above the topmost unit 62 there is also provided a space 70 which serves as an accumulation chamber for receiving therein coarse sediment and the like which may be introduced into the device through the drain outlet 12.

Figure 3:
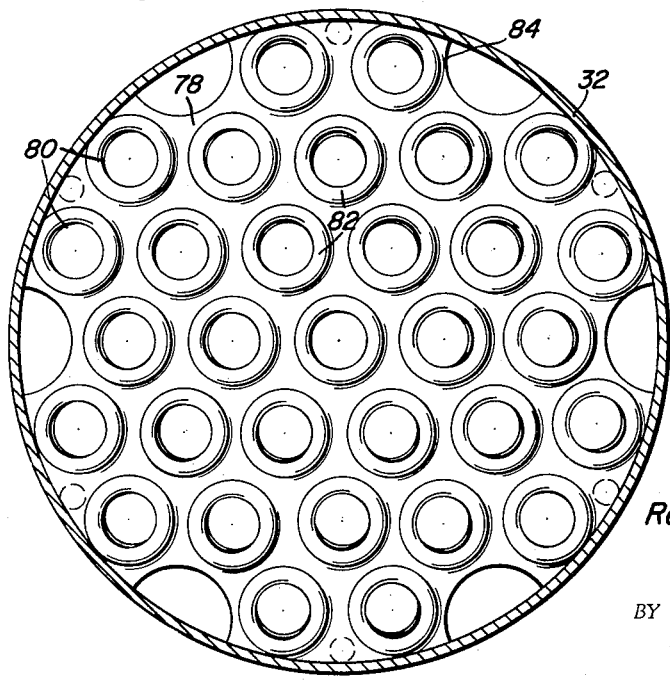
FIGURE 3 is a detail view in horizontal section taken substantially upon the plane indicated by the section line 3—3 of FIGURE 2.

From a consideration of FIGURES 2 and 3 it will be observed that each of the units 62 is preferably of identical construction and each consists of an upper and a lower oppositely dished member 72 and 74, respectively, which are provided with perforations or apertures 76 therethrough. Conveniently these members are reversely positioned cones and each pair of reversely positioned cones embraces therebetween a perforated flat disk 78 likewise having perforations 80 therethrough. The disks and cones as well as the bottom disk 66 are of any suitable material, being preferably of sheet metal. An important feature of this invention resides in the fact that each of the apertures or perforations 76 of the cones and 80 of the disks has its rim or edge folded over or displaced to provide projecting rims or beads as at 82. Preferably the disk 66 is identical in construction with the disks 78 which form the central member of each of the units 62.

In some instances it may be desired to mechanically or fixedly secure together the coterminous circular edges or peripheries of the cones and disk within each unit. Generally, however, the cones or disks are separate members which may be individually assembled into units and used individually placed in the housing.

At their peripheries each of the disks and if desired each of the cones is provided with semicircular recesses 84 providing channels or passages at the walls of the housing.

As so far described the arrangement operates as follows. When liquid is discharged into the kitchen drainage system through the drain outlet 12 of the sink, it will pass through the series of units disposed in the housing before being delivered through the gooseneck trap 18 to the main drain line 16. During this passage the liquid will strike the top unit 62 and will flow downwardly across the upper conical surface of the top cone thereof. The raised rims of the apertures therein will tend to spread the liquid more completely over the surface of the cone before it passes through these apertures and through the openings 84. The liquid passing through the apertures of the top cone will then drop upon the disk 78 therebeneath and be again spread uniformly over the entire cross-sectional area of the housing before passing through the reversely positioned cone 74 immediately therebeneath. From the latter the liquid will drop to its succeeding unit and so on until it passes through the entire series of separators. During this passage, owing to the long path of travel of liquid over the surfaces of the plurality of separator elements, the grease tends to separate from the liquid and tends to collectively accumulate upon the cones and disks of the units. The residue liquid, being substantially free from grease then passes through the outlet means 36 and into the gooseneck trap. Consequently, substantially all of the grease and fatty components of the liquid is discharged into the drainage system or collected in the trap 30 where it may be easily removed, thus maintaining the rest of the drainage system free of fat and grease deposits therein.

As will now be best understood from an inspection of FIGURE 1, the U-shaped trap 20 will maintain a liquid level in itself and also in the lower portion of the housing 32. This liquid level will approximate the bottom wall of the upper or bight portion of the inverted U-bend 24. As a result of this liquid level maintained in the housing 32, any greases and fats which may pass through the trap will float to the top thereof and thus be again returned through the movement of the liquid into the separator unit 62 where they will gradually separate and collect.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A grease trap for kitchen drain systems of the type including a sink drain outlet, a main drain line and a gooseneck trap connected therebetween, comprising a vertically elongated housing, inlet and outlet means at the top and bottom of said housing and respectively connected to and communicating with and supported by said sink drain outlet and said gooseneck trap, a plurality of vertically spaced separator units disposed in said housing in spaced relation to and positioned between said inlet and outlet means, each unit comprising a pair of reversely dished perforated members with a perforated disk therebetween, said members and disks having an upstanding wall at the periphery of each aperture and encircling the latter, support means on the interior walls of said housing carrying said units.

2. The combination of claim 1 wherein said members consist of upper and lower cones having the larger ends disposed towards each other, the rims of said cones and the interposed disk being coterminous.

3. The combination of claim 1 including a collection chamber disposed in said housing between the lowest unit therein and said outlet means for the accumulating of granular solid matter, said gooseneck trap being so disposed as to maintain a water level in said housing above the lower unit.

4. The combination of claim 1 including a collection chamber disposed in said housing between the lowest unit therein and said outlet means for the accumulating of granular solid matter, said gooseneck trap being so disposed as to maintain a water level in said housing above the lower unit, the upper unit being disposed below the top of said housing to provide sufficient space for accumulating coarse sediment.

5. The combination of claim 1 wherein, said members consist of upper and lower cones having the larger ends disposed towards each other, the rims of said cones and the interposed disk being coterminous, said disks and cones having their peripheries secured to each other and substantially engaging the walls of said housing, the rims of said cones and disks being notched to provide marginal passages therethrough.

6. The combination of claim 1 including a flat, perforated disk in the lower portion of said housing engaging the bottom of the lowermost unit, said disk being supported at its periphery upon inwardly projecting supports on the wall of said housing.

References Cited in the file of this patent

UNITED STATES PATENTS

| 454,665 | Prendergast | June 23, 1891 |

FOREIGN PATENTS

| 8,440 | Great Britain | of 1891 |
| 16,069 | Great Britain | of 1913 |
| 142,703 | Great Britain | May 13, 1920 |